United States Patent [19]
Muller et al.

[11] Patent Number: 5,226,452
[45] Date of Patent: Jul. 13, 1993

[54] DRAIN PLUG FOR A HYDRAULIC CIRCUIT

[75] Inventors: Philippe Muller, Argenteuil; Raphaël Aires, Espagne, both of France

[73] Assignee: Bendix Europe Services Technique, Drancy, France

[21] Appl. No.: 825,672

[22] Filed: Jan. 27, 1992

[30] Foreign Application Priority Data

Jan. 31, 1991 [FR] France .................. 91 01075

[51] Int. Cl.⁵ .............................. B60T 11/30
[52] U.S. Cl. ................................ 137/630.22
[58] Field of Search ...................... 137/630.22

[56] References Cited

U.S. PATENT DOCUMENTS

| | | | |
|---|---|---|---|
| 1,850,457 | 3/1932 | Hughes | 137/630.22 |
| 3,227,182 | 1/1966 | Garman | 137/630.22 |
| 3,442,080 | 5/1969 | Rockwell | |
| 4,674,541 | 6/1987 | Fulmer | |

FOREIGN PATENT DOCUMENTS 1915461 10/1970 Fed. Rep. of Germany .
2548609  1/1985 France .

Primary Examiner—Robert G. Nilson
Attorney, Agent, or Firm—Larry J. Palguta; Ken C. Decker

[57] ABSTRACT

The invention relates to a drain plug for a hydraulic circuit, comprising, in a body (22), a shut-off element (40) permitting or preventing the communication between two subcircuits (I, II). According to the invention, it comprises at least one second shut-off element (56) permitting or preventing the communication between at least one of the two subcircuits (I, II) with at least a third subcircuit (III).

5 Claims, 4 Drawing Sheets

DRAIN PLUG FOR A HYDRAULIC CIRCUIT

The subject of the present invention is a drain plug for a hydraulic circuit, for example for a motor vehicle braking circuit.

The document FR-A-2,548,609 discloses such a drain plug in which a valve passage can be opened or closed manually between a pressure duct and a line leading to the brake fluid reservoir. For complex circuits, it will therefore be necessary to use the same number of such drain plugs as the circuit has subcircuits, which increases the number of components and hence the number of risks of leakages, as well as the cost of the braking circuit, while at the same time complicating the draining operation.

The object of the invention is therefore to provide a drain plug which is simple and inexpensive to construct and which permits the simultaneous draining of a plurality of subcircuits.

To this end, the invention provides a drain plug for a hydraulic circuit, comprising, in a body, a shut-off element permitting or preventing the communication between two subcircuits.

According to the invention, the drain plug comprises at least one second shut-off element permitting or preventing the communication between at least one of the two subcircuits with at least a third subcircuit.

The invention will now be described by way of example with reference to the accompanying drawings in which.

Figure 1:
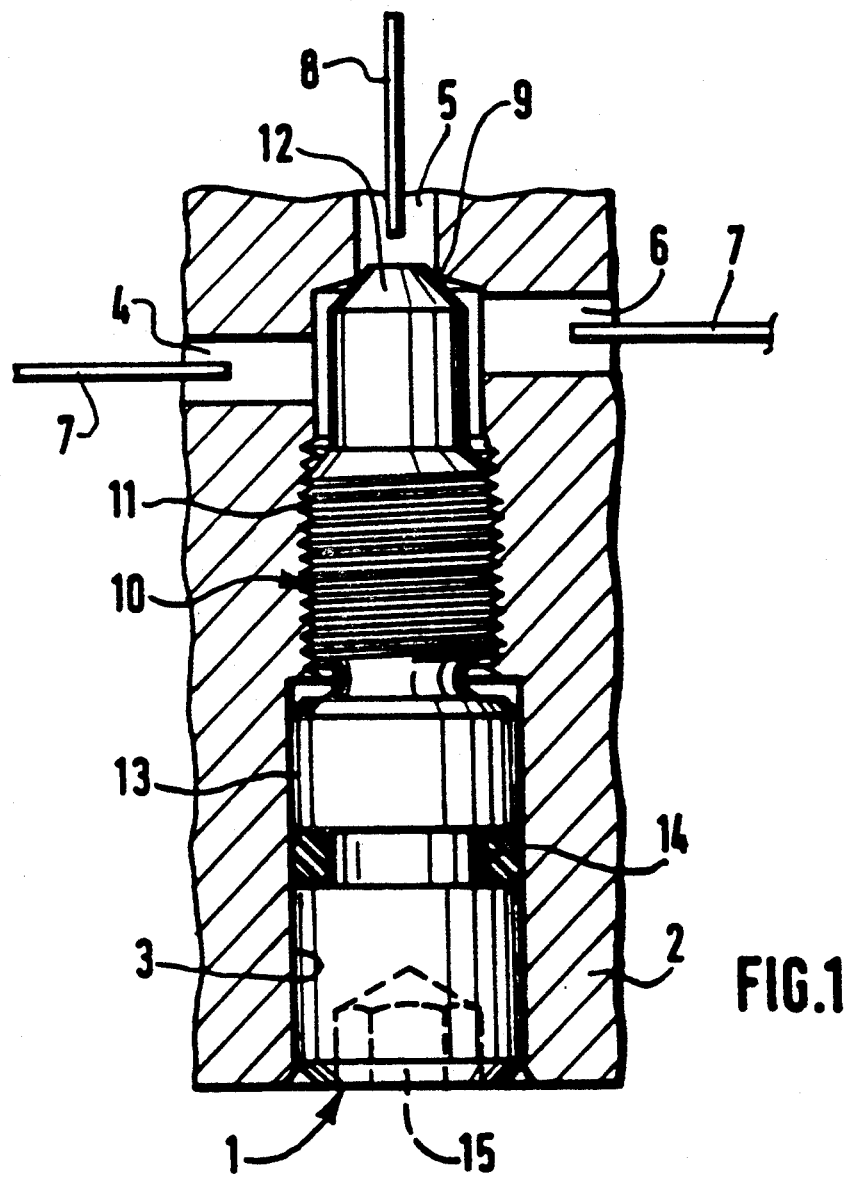
FIG. 1 shows, in cross-section, a drain plug of the prior art.

A drain plug, such as that known for example from the abovementioned document, has been shown in cross-section in FIG. 1. This drain plug 1 comprises a casing 2 with a cylindrical bore 3. This casing 2 of the drain plug 1 has three connections 4, 5, and 6. The connections 4 and 6 are connected hydraulically to a circuit 7 connecting solenoid valves (not shown) to wheel brakes (not shown), the connection 5 being connected to a duct 8 leading to an unpressurized supply reservoir (not shown).

The upper end (when viewing FIG. 1) of the cylindrical bore 3 is provided, at its transition to the connection 5, as a valve seat 9. A central portion 10 of the cylindrical bore 3 is equipped with a helical thread in which is arranged a threaded bolt 11, the upper end of which (when viewing FIG. 1) is provided as a shut-off member 12 and constitutes, interacting with the seat 9, a sealable valve passage situated between the ducts 7 and 8.

The end portion 13 of the threaded bolt 11 furthest from the shut-off member 12 carries a sealing ring 14 and has, on its end face, a hexagon socket 15 into which an appropriate screwing tool can be introduced, which permits the manual adjustment of the valve passage 9-12.

It can therefore be seen that the maneuvering of the threaded bolt permits the draining of the circuit 7 connected to the connections 4 and 6 by associating the duct 7 with the unpressurized supply reservoir and then, once the draining has been carried out, isolating the duct 7 with respect to this reservoir in order to permit the functioning of the braking installation. It can therefore clearly be seen that it is necessary to use one such drain plug per circuit or part circuit to be drained, resulting in the abovementioned disadvantages.

Figure 2:
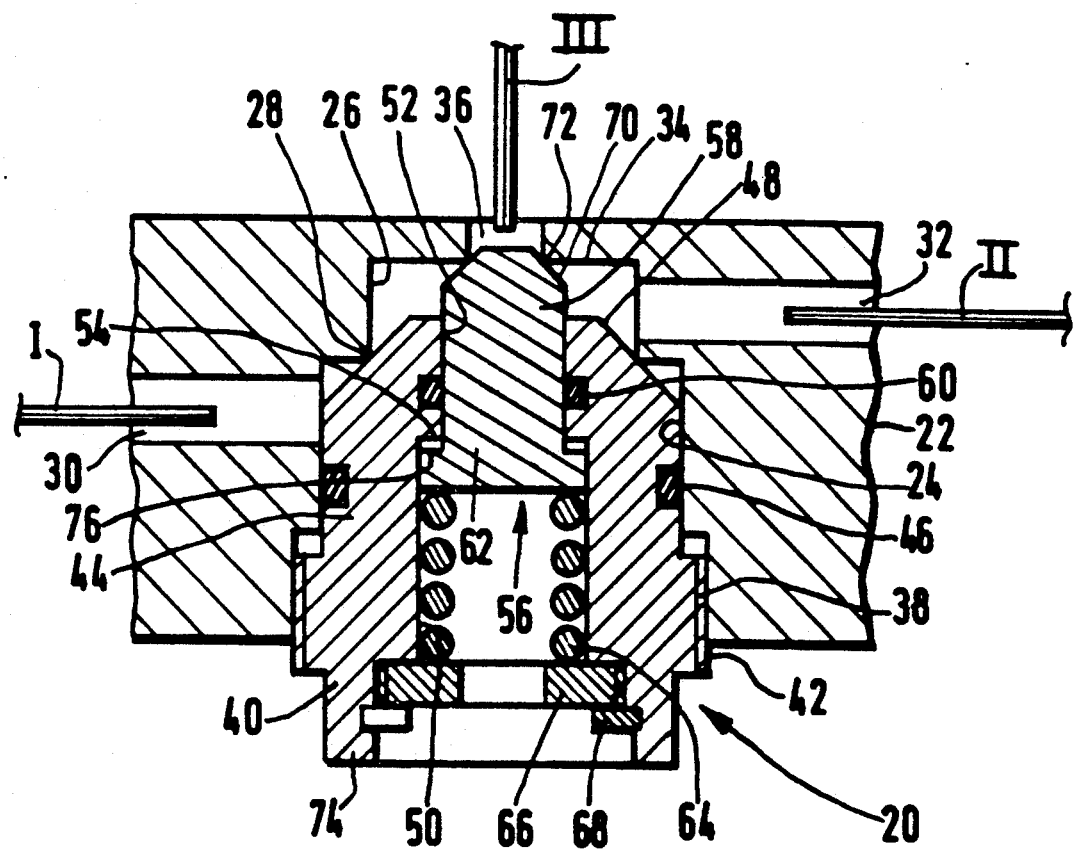
FIG. 2 shows, in cross-section, a first embodiment of a drain plug constructed in accordance with the present invention.

These disadvantages are overcome by using a drain plug constructed according to the present invention and an embodiment of which has been shown in FIG. 2.

In accordance with the present invention, the drain plug 20 comprises a body 22 equipped with a stepped bore comprising a portion 24 of greater diameter and a portion 26 of smaller diameter, these two portions defining together a shoulder 28.

A pierced hole 30, forming a connection for a first hydraulic subcircuit I, opens out into the portion 24 of larger diameter. Similarly, a pierced hole 32, forming a connection for a second hydraulic subcircuit II, opens out into the portion 26 of smaller diameter, and a pierced hole 36, forming a connection for a hydraulic subcircuit III leading for example to an unpressurized supply reservoir, opens out into the bottom 34 of the portion 26 of smaller diameter of the stepped bore. The end of the portion 24 of larger diameter of the stepped bore opening out toward the outside of the body 22 is formed with an internal screw thread 38.

A plug 40 is introduced into the stepped bore 24, 26 by means of an external screw thread 42 formed on part of one of its ends. The plug 40 has a central part 44 interacting in sealing fashion, via a seal 46, with the portion 24 of larger diameter of the stepped bore, and a frustoconical end part 48, opposite that which carries the external screw thread 42, forming a valve with the seat constituted by the shoulder 28.

The plug 40 is itself formed with a stepped bore comprising a portion 50 of larger diameter and a portion 52 of smaller diameter, defining together a shoulder 54. In the stepped bore 50-52, a stepped piston 56 slides, the intermediate part 58 of which, of smaller diameter, interacts in sealing fashion, via a seal 60, with the portion 52 of the stepped bore, and an end part 62 of which, of larger diameter, slides in the portion 50 of the stepped bore.

The stepped piston 56 is stressed toward the outside of the plug 40 by a pressure spring 64 arranged between the end part 62 of the piston 56 and a bearing piece 66 arranged in the bore of the plug 40 and held in place by a circlip 68. The stepped piston 56 also has a frustoconical end part 70, opposite the part 62 of greater diameter and projecting out of the plug 40, forming a valve with the valve seat 72 formed by the transition between the bottom 34 of the bore 24-26 formed in the body 22, and the pierced hole 36.

The drain plug according to the invention is shown in FIG. 2 in the position which it occupies during normal operation of the hydraulic circuit on which it is installed. In order to carry out a draining operation on the hydraulic circuit, the drain plug 20 is unscrewed, the plug 40 being, for example, shaped on its part 74 projecting out of the body 22 in the form of a hexagon nut. When this happens, the valve passage between the frustoconical part 48 of the plug 40 and the seat 28 formed between the portions 24 and 26 of the stepped bore of the body 22 opens, permitting the communication between the connections 30 and 32, and hence between the subcircuits I and II.

During the unscrewing of the plug 40, the piston 56 is at all times stressed toward the outside of the plug, with the result that at the beginning of the unscrewing, whereas the valve passage 28-48 opens, the valve passage formed between the frustoconical part 70 of the piston 56 and the seat 72 formed at the bottom 34 of the stepped bore of the body 22 remains closed. It remains so until the shoulder 54 between the portions 50 and 52 of the bore of the plug 40 comes into contact with the shoulder 76 formed between the parts 58 and 62 of the piston 56. At this moment, the valve passage 70-72 also opens, thus bringing the subcircuits I and II into communication with the connection 36, and hence with the subcircuit III.

The draining operation, for example of the type known under the name of draining under vacuum, can then take place via the subcircuit III. The subcircuit III first has a vacuum applied to it, which causes a vacuum to be applied to the subcircuits I and II, and then pressurized hydraulic fluid is introduced through the subcircuit III into the subcircuits I and II. Once this operation has been carried out and once the subcircuits I and II no longer contain any air, the drain plug 20 can be screwed in again.

During the operation of screwing in again by acting on the part 74 of the plug 40, the latter penetrates into the body 22 until the piston 56 shuts off the valve passage 70-72. The subcircuits I and II are then isolated from the subcircuit III. By continuing the operation of screwing the plug 40 in again, the piston 56 remains in the position shutting off the connection 36 which it occupied beforehand, whilst the plug 40 continues to penetrate into the body 22, compressing the spring 64, until it shuts off the valve passage 28-48. The subcircuits I and II are then isolated from each other, and the hydraulic circuit constituted by these three subcircuits can then function normally.

It can therefore clearly be seen that a drain plug has been constructed which makes it possible, in a single operation, to carry out the draining of two separate circuits, and permits this in a particularly simple, reliable and inexpensive manner by way of two shut-off elements, the plug 40 and the piston 56, each interacting with a valve seat, 28 and 72 respectively, formed in the body 22.

Figure 3:
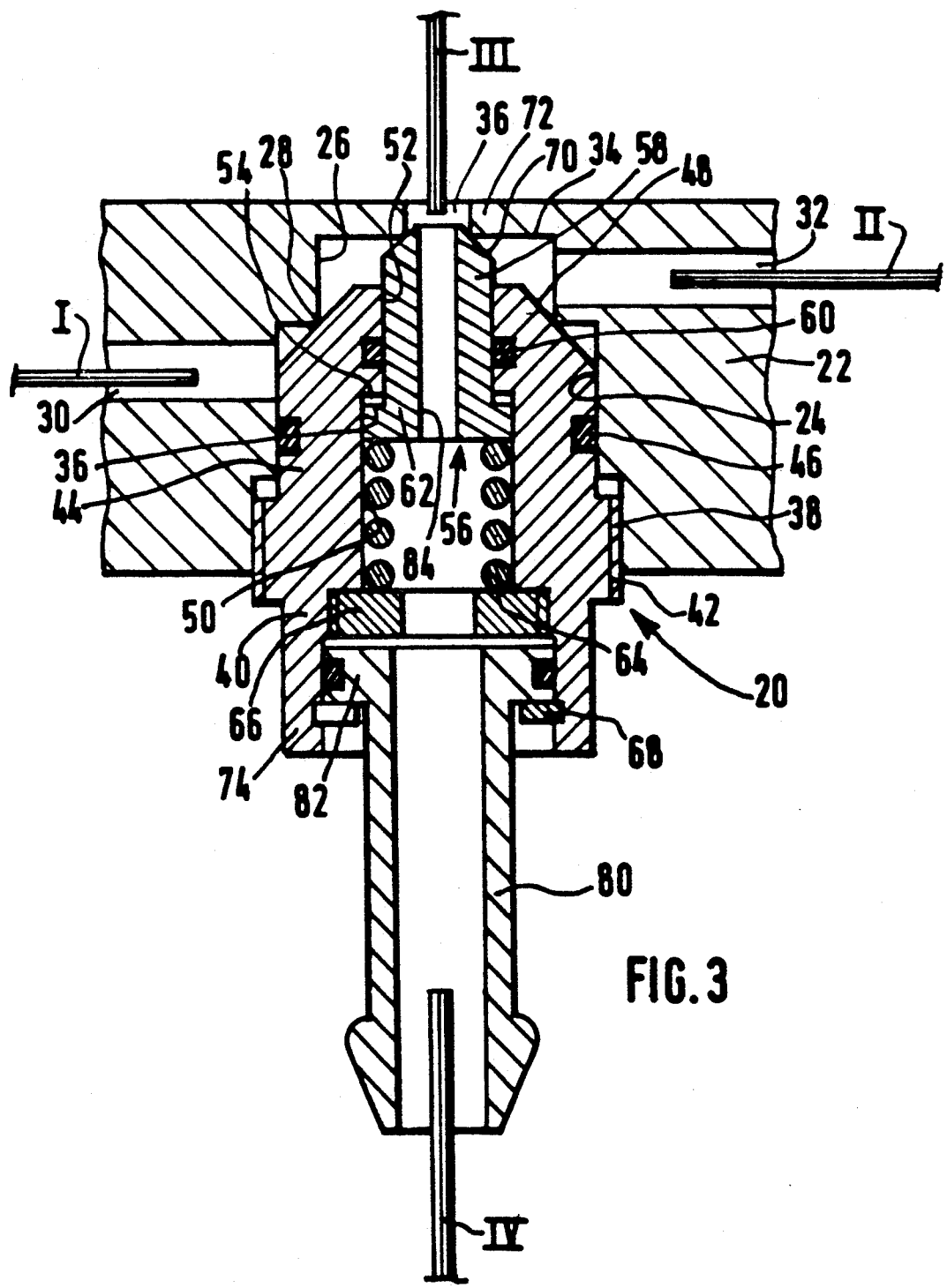
FIG. 3 shows, in cross-section, an alternative form of the embodiment in FIG. 2.

An alternative of the embodiment of the drain plug shown in FIG. 2 has been shown in FIG. 3, in which the drain plug furthermore permits a constant connection to the unpressurized supply reservoir. In FIG. 3, elements identical to those in FIG. 2 carry the same reference numerals.

It can be seen in FIG. 3 that a socket 80 has been arranged on the drain plug, this socket being intended to be connected to the subcircuit IV leading to the unpressurized supply reservoir.

The socket 80 has a widened base 82 arranged in sealing fashion in the bore of the plug 40, and is immobilized in the latter between the bearing piece 66 and the circlip 68. Moreover, a bore 84 is formed in the piston 56, and the connection 36 is connected to a subcircuit III which, during normal operation of the hydraulic installation with which the drain plug according to the invention is equipped, returns hydraulic fluid to the unpressurized supply reservoir via the subcircuit IV.

A draining operation under vacuum takes place as has been explained with reference to FIG. 2. With the drain valve unscrewed sufficiently to open the valve passages 28-48 and 70-72, a vacuum is applied to the subcircuit IV, which causes a vacuum to be applied to the subcircuits I, II and III. Pressurized hydraulic fluid is then introduced via the subcircuit IV into the subcircuits I, II and III, and the drain plug is then screwed in again. As above, during the screwing of the drain plug in again, firstly the valve passage 70-72 is shut off, thus isolating the subcircuit III from the subcircuits I and II, and then the valve passage 28-48 is shut off, thus isolating the subcircuits I and II from each other, in order to permit normal functioning of the hydraulic installation consisting of these three subcircuits.

It can therefore also be seen that by way of the invention a drain plug has been constructed which makes it possible, in a single operation, to carry out the draining of three separate circuits, and permits this in a manner which is likewise simple, reliable and inexpensive, using two shut-off elements, the plug 40 and the piston 56, each interacting with a valve seat, 28 and 72 respectively, formed in the body 22.

Figure 4:
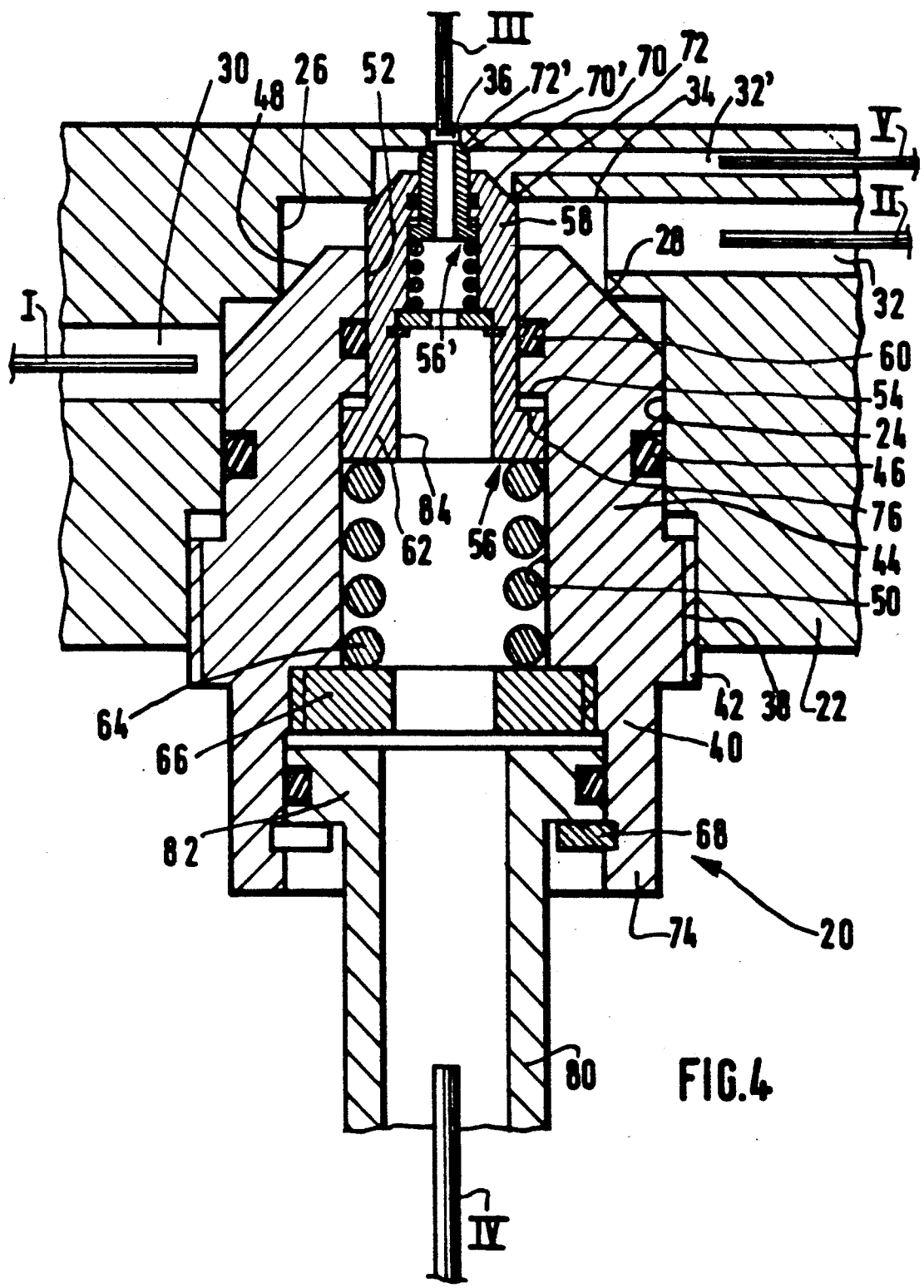
FIG. 4 shows, in cross-section, a second alternative embodiment of a drain plug constructed in accordance with the present invention.

It is also possible to provide for the carrying out, in a single operation, of the draining of four separate circuits, by arranging a third shut-off element, as shown in FIG. 4. This third shut-off element consists of a second piston 56' arranged in the piston 56 in the same manner as the latter is arranged in the plug 40, and which there is therefore no need to describe in detail. The piston 56' interacts with a third valve seat 72' in order to form a valve passage 70'-72', and a connection 32' is formed in the body 22 between the valve seats 72 and 72' for a fifth hydraulic subcircuit V. The operation of this embodiment can easily be inferred from that which has been explained with relation to FIG. 2, the valve passages 70'-72', 70-72 and 28-48 being shut off, in this order, when the drain plug is screwed in again, once the draining operation under vacuum has been carried out, in order to isolate the subcircuits I, II, III and V from one another, the subcircuits III and IV being common.

We claim:

1. A drain plug for a hydraulic circuit, comprising, in a body, a first shut-off element permitting or preventing communication between two subcircuits and at least one second shut-off element permitting or preventing communication between at least one of the two subcircuits with at least a third subcircuit, the second shut-off element sliding sealingly in a bore of the first shut-off element, and the second shut-off element biased by elastic means in a direction in which the second shut-off element prevents the communication between at least one of the two subcircuits with the third subcircuit.

2. The drain plug according to claim 1, wherein the body comprises at least two valve seats each interacting with a shut-off element.

3. The drain plug according to claim 1, wherein the first shut-off element and second shut-off element contain bores connecting permanently the third subcircuit with an unpressurized supply reservoir.

4. The drain plug according to claim 3, wherein the bores in the first shut-off element and second shut-off element are coaxial.

5. The drain plug according to claim 4, comprising fourth and fifth subcircuits, and a third shut-off element permitting or preventing communication between the fifth subcircuit and at least one of the first through third subcircuits.

* * * * *